Dec. 4, 1956     E. A. MALICK     2,772,728

TURBOJET IDLE-SPEED CONTROL

Filed March 17, 1952     3 Sheets-Sheet 1

INVENTOR.
E. A. MALICK

BY Hudson & Young

ATTORNEYS

Dec. 4, 1956          E. A. MALICK          2,772,728
TURBOJET IDLE-SPEED CONTROL

Filed March 17, 1952          3 Sheets-Sheet 3

INVENTOR.
E. A. MALICK

BY

ATTORNEYS

United States Patent Office 2,772,728
Patented Dec. 4, 1956

2,772,728

TURBOJET IDLE-SPEED CONTROL

Emil A. Malick, Bartlesville, Okla., assignor to Phillips Petroleum Company, a corporation of Delaware Application March 17, 1952, Serial No. 276,948

3 Claims. (Cl. 158—36)

This invention relates to turbojet engines. More particularly this invention relates to an improved means and method for operating a turbojet engine. In one of its aspects this invention relates to a method and apparatus for improving the performance of a turbojet engine when operated at the idle-speed setting of the throttle.

In turbojet engine operation it is observed that as altitude is increased at any constant rotational speed of the turbine and compressor, a point is reached at which engine combustion becomes unstable and at some altitude the combustion process ceases entirely. As shown in the accompanying drawing, Fig. 1, the curve D, identified as dead-band limit curve, represents the limiting conditions where, with a further increase in altitude at a given value of engine speed, combustion ceases. As shown in this turbojet altitude-engine speed relationship, this curve separates the regions where the turbojet engine is operative from where the engine is inoperative.

It has also been observed in turbojet engine operation that at constant fuel flow to the combustion zone and with an increase in altitude, the engine temperature rise, $\Delta T$ difference between the temperatures of the combustion gases and inlet air), increases. Generally, as altitude increases, the fuel required to maintain a given engine speed decreases and the engine speed required to maintain stable combustion increases. However, for any given altitude or set of operating conditions there is a certain minimum engine speed below which the engine cannot operate. Operation of the turbojet engine at about but not below this minimum engine speed, or close to the dead band limit curve is known as idle-speed.

In turbojet engine design devices are employed in the fuel supply system which are supposed to supply to the engine at all times sufficient fuel so as to prevent the engine from encountering the dead band limit. In some jet fuel metering systems devices are employed which prevent the fuel supply to the engine from falling below a certain fixed value. With this type of control, a relationship like line A of Fig. 1 might exist. In other jet fuel metering systems, devices are employed which, by regulation of the minimum fuel flow permitted by the control, attempt to approximate or parallel the dead-band limit curve in a manner which will not permit such a degree of reduction of fuel supply as might cause the dead band limit curve to be encountered and combustion to cease. However, the devices employed heretofore fail to compensate for superior or inferior fuels relative to the particular fuel with which these controls are set. The lines A, B and C of Fig. 1 are illustrative of a relationship between altitude and engine speed at a constant, fixed rate of fuel flow to the engine (lines B and C representing an inferior and superior fuel respectively relative to the reference fuel).

As indicated hereinabove, it is desired that at idle speed setting of the throttle the fuel flow be such that the lowest permissible engine speed is approximated at any particular altitude. In some fuel metering and control systems a simple bleed is provided in the control valve of the fuel line, whereas in other systems the fuel flow is regulated by certain physical properties of the fuel, hydraulic effects which are set up by passage of the fuel through a sensing element of the control. The fuel flow in the bleed-type metering system is substantially constant and the approximation of the dead band limit curve is usually poor, see line A of Fig. 1, but in the hydraulic-type metering system where the minimum fuel flow may be variable, closer approximation of the dead-band limit curve is possible. However, regardless of the fuel metering control system used, the control effected by these methods is dependent upon the physical properties of the fuel and not its combustion properties and accordingly the degree of control achieved is different for every different fuel.

The curves in Fig. 1 show the altitude-engine speed relationships which result with various fuels using a fuel metering system in which the throttle is in the idle-speed setting, with a certain minimum, constant fuel supply to the engine. These curves are illustrated as straight lines for purpose of simplicity. Actually the curve defined by the idle-speed setting may have various shapes, depending on the characteristics of the engine and the type of fuel metering system employed, provided of course the curve does not pass into the region defined by the dead-band limit curve where the engine is inoperative.

In Figure 1 the dead-band curve is a characteristic of the turbo-compressor and not of the fuel. For any specific turbo-compressor at a specific altitude, there is a minimum rotational speed which must be maintained in order that the compressor may bring in sufficient air for combustion, regardless of the fuel used. However, as shown in Figure 1, a poor fuel possesses an unfavorable combustion ability so that at a certain altitude, with a certain compressor, the rotational speed may be so low that the compressor will bring in insufficient air for combustion. On the other hand, a superior fuel possesses a favorable combustion ability which would cause the compressor to turn more rapidly thus bringing in sufficient air. Of course, if the altitude is so great that relatively little air is present in the atmosphere, then no fuel would be good enough. There is some altitude limit for any fuel, no matter how superior the fuel may be. However, it is possible to have a fuel so superior that the maximum safe speed of the compressor (a purely mechanical limitation on the machine) might be exceeded at some particular altitude before the amount of air delivered to the combustor at a minimum operable fuel rate would be sufficient. In such an instance the limitation would be in the machine and not in the fuel.

In the conventional methods employed and referred to hereinabove for incorporating a minimum fuel flow, a certain minimum fuel flow is set for operation with some, particular fuel, which may be called a reference fuel. When operating at a constant minimum fuel flow a curve similar to A of Fig. 1 is obtained. As previously mentioned, the conventional metering systems operate on variables related to the physical properties of the fuel and not to the combustion properties of the fuel and its utilization as a fuel in the engine. Thus, where the combustion properties of the fuel differ from those of the fuel for which the idle-speed control was set there will be a tendency for the minimum fuel flow curve to be shifted in position from the minimum fuel flow curve for the reference fuel. As illustrated in Fig. 1, line B for a fuel of poor combustion properties is shifted to the left of the line A of the reference fuel and line C for a fuel of superior combustion properties is shifted to the right of the reference line A. This can have several undesirable effects. In the case of the poor fuel, the displacement to the left may be sufficient to allow tangency with or intersection of the dead-band limit curve. If tangency or near approach with the dead-band limit curve D occurs, unstable combustion and possible complete cessation of combustion might result, whereas with intersection of the dead-band limit curve the engine becomes inoperative unless the fuel flow is increased by operator adjustment. In the case of the superior fuel, the displacement to the right may cause intersection with the line of maximum rated engine speed such that it may not be possible to obtain the full desired altitude, or that altitude at which the engine might otherwise be capable of obtaining, unless the maximum rated engine speed of the engine is exceeded.

It is an object of this invention to provide a method and apparatus for improved turbojet performance at idle-speed settings of the throttle (minimum fuel flow for operability). Another object of this invention is to provide a method and apparatus for controlling the engine speed of a turbojet engine (R. P. M.) at the idle-speed setting of the throttle in accordance with a predetermined function of the engine or aircraft altitude which compensates for variations in fuel properties and engine conditions which affect combustion. In at least one embodiment of this invention at least one of these objects will be attained. How these and other objects are attained is explained and set forth with reference to the accompanying drawings, in which:

Figure 1:
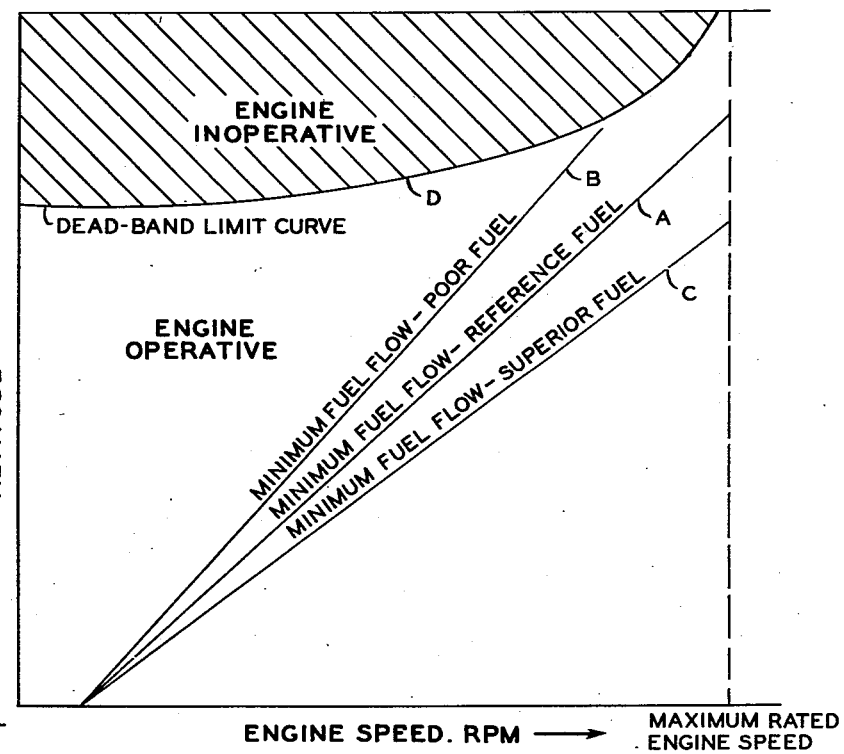
Figure 1 is a graph illustrating the dead-band limit curve of a turbojet engine and showing the relationship between altitude and engine speed at a constant fixed rate of fuel flow to the engine.

I have now discovered that improved turbojet engine performance at idle-speed setting of the throttle is obtained by regulating fuel flow at the idle-speed setting in accordance with the combustion of the fuel as indicated by engine performance or engine speed. In accordance with my invention I minimize displacement of the altitude-engine speed relationship at idle speed from that established for the engine in its original calibration. I have further found a method for controlling the engine speed of a turbojet engine at idle-speed setting of the throttle as a predetermined function of the altitude so that a certain minimum engine speed is maintained for a given altitude regardless of the particular properties of the fuel being used. The manner in which I accomplish this control represents only an element of the complete fuel metering control system and comprises a suitable device in which a demand signal that varies as a predetermined function of the altitude is balanced against a response signal proportional to the engine speed and the resulting output signal applied to a control valve in the fuel system to regulate the fuel supply to the combustion chamber of the engine. In this control system the idle-speed setting is not determined by the physical properties of the fuel but by the response of the engine to the fuel burned, which is indicative of both physical and chemical properties of the fuel and the engine operation itself. The demand signal represents and is proportional to the minimum engine speed, R. P. M., permitted at each altitude. Each engine has for each altitude at which it operates a certain minimum engine speed, R. P. M., required for engine operability. Below this certain minimum engine speed the engine is inoperative. Thus, there exists for each engine a relationship between altitude and minimum engine speed; this relationship may be illustrated by a suitable curve. It is then decided how closely this curve may be approximated without undue danger of encountering an inoperative engine condition. The altitude component of my fuel control system delivers a demand signal, $e_A$, which is proportional to and related to the engine speed R. P. M., as required by the altitude-engine speed relationship decided. For example, if the decided relationship can be represented as being linear, an equation relating the decided minimum R. P. M. to be permitted by the control to engine altitude has the form $y=mx+b$ where $x$ represents the minimum R. P. M. to be permitted, $m$ and $b$ are suitable constants and $y$ represents the altitude. Accordingly, the demand signal $e_A$ is proportional to $x$ in the above equation.

In one embodiment of my invention, the demand signal, as a function of altitude, is supplied in the form of a voltage of varying value as detected by an altitude responsive means, for example a pressure responsive means such as a spring-loaded bellows exposed to atmospheric pressure, and the response signal, proportional to the engine speed, is supplied in the form of a voltage generated by an engine speed responsive means such as a tachometer generator. These two voltages are compared by some suitable balancing device or circuit, and the output used to control a valve in the fuel line. Whenever the demand voltage exceeds the response voltage, the valve opens and the fuel flow to the engine is increased. This results in increased engine speed and, therefore, increased response voltage. This increase continues until demand and response voltages are balanced, at which point the control of the valve ceases. Whenever response voltage exceeds demand voltage, the speed of the engine is controlled by the throttle setting.

Figure 2:
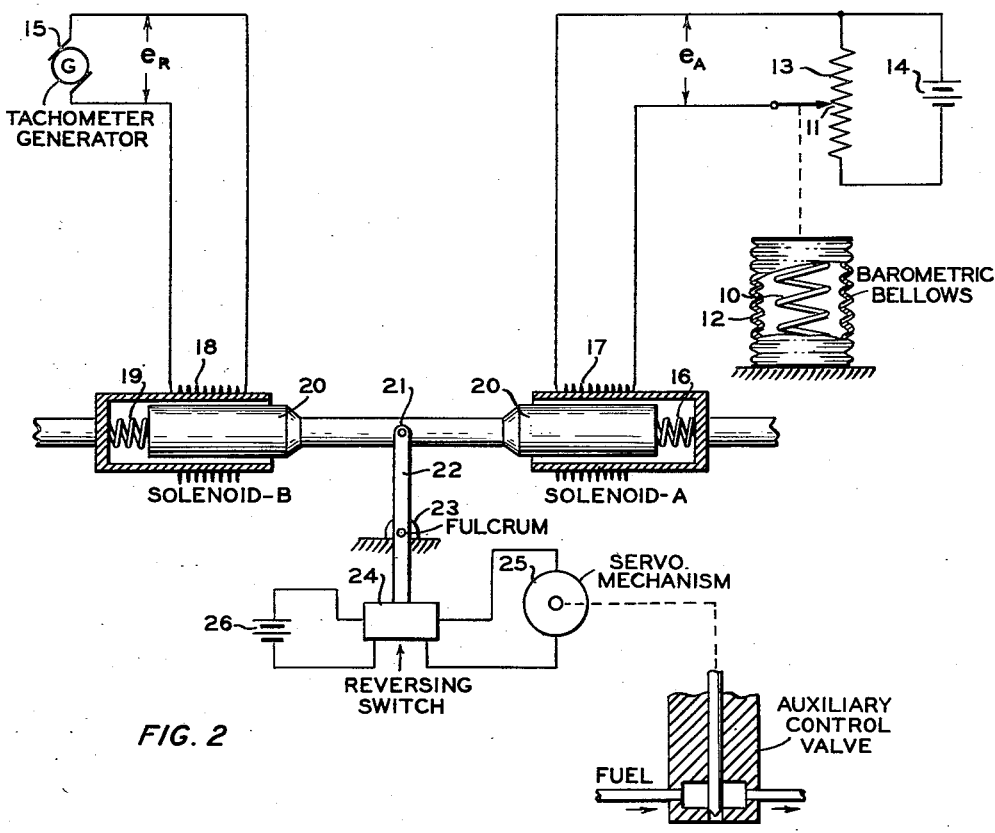
Figure 2 illustrates schematically one embodiment of my invention.

Referring to Figure 2, $e_R$ is a voltage proportional to engine speed, and $e_A$ is a voltage proportional to some function of altitude. For the sake of simplicity, this function of altitude is assumed to be linear so that $e_A$ varies in accordance with the equation $y=mx+b$ where $x$ represents minimum permissive R. P. M., $y$ represents the altitude and $m$ and $b$ are constants which may be determined by the loading of the spring 10 on the barometric bellows 12. Alternatively, constant $b$ may be supplied by feeding the voltage from the continuously variable potential divider 13 to a triode vacuum tube having a cathode follower of the correct resistance. In the embodiment shown in Fig. 2 a voltage from the source of supply 14 is applied across the winding of the continuously variable potential divider and the current flowing develops the voltage $e_A$ between the contact point 11 and the end of the winding of the continuously-variable potential divider as the movable arm is moved in accordance with the function of altitude as detected by the bellows in combination with the spring. In this case, the winding of the potential divider is linear; however, if the function of the altitude is desired to be non-linear, the winding of the potential divider may be constructed to develop a non-linear voltage. The voltage proportional to engine speed, $e_R$, is provided by the tachometer generator 15 or by some other conventional apparatus for measuring rotational engine speed.

In accordance with this embodiment, the balancing device in which the voltages $e_A$ and $e_R$ are compared is mechanical in principle in that the forces developed by the current flowing in the winding of each of the solenoids resulting from the application of the voltages $e_A$ and $e_R$ to each of the winding of said solenoids are balanced against each other. Thus, the demand voltage $e_A$, which may be amplified if necessary, is applied to the winding or coil 17 of rigidly-mounted solenoid A which is loaded by spring 16 and the response voltage $e_R$ is applied to the coil 18 of rigidly mounted solenoid B loaded by spring 19. The cores 20 of the solenoids are connected by means of the rigid arm 21. As one voltage exceeds the other, the current flowing in that corresponding coil causes a greater force to be developed in that corresponding solenoid than is developed in the other solenoid by the current flowing in it, and rigid arm 21 moves to cause a movement in arm 22 which, in turn, operates through fulcrum 23 and throws reversing switch 24. The source of potential applied to servomechanism 25 is from the source 26 through reversing switch 24. Whenever the demand signal (force developed by solenoid A) is greater than the response signal (force developed by solenoid B) a voltage of a definite polarity, from source 26 is applied to servomechanism 25 by the closing of reversing switch 24. The polarity of the voltage is such as to cause servomechanism to tend to open the auxiliary fuel control valve which is in parallel with the main fuel control, throttle operated valve in order to permit more fuel to flow therethrough. Whenever the demand signal is less than the response signal a voltage of the opposite polarity from source 26 is applied to servomechanism 25 by the closing of reversing switch 24 in the other opposite position. The opposite polarity of the voltage is such as to cause servomechanism to tend to close the auxiliary fuel control valve in order to reduce the flow of fuel therethrough. When the demand signal is equal to the response signal reversing switch is in the open position and no voltage is applied to the servomechanism, the rate of fuel flow through the auxiliary valve being unchanged.

Figure 3:
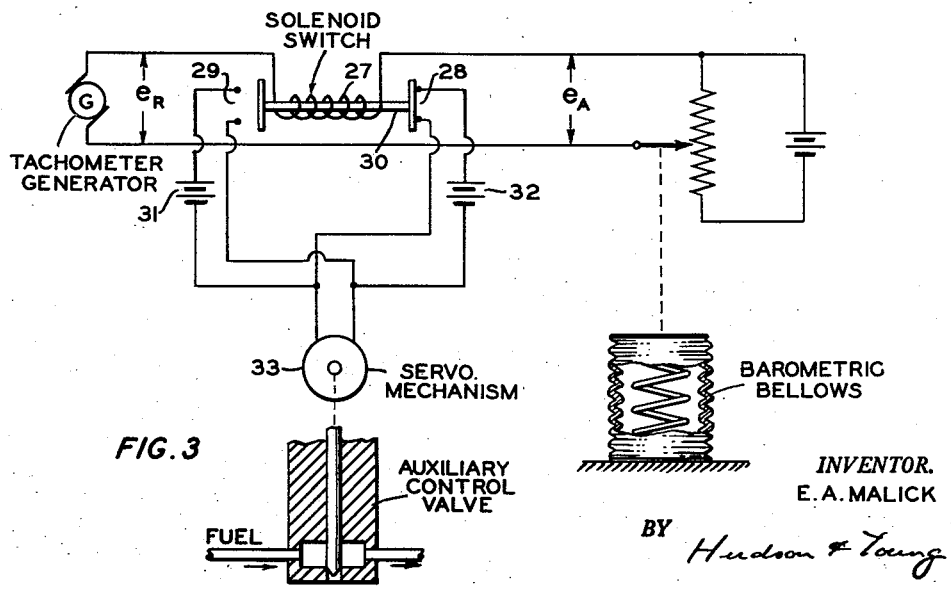
Figure 3 illustrates schematically another embodiment of my invention.

Referring now to Fig. 3 which illustrates another embodiment of my invention, the voltages $e_A$ and $e_R$ obtained in the manner as set forth with reference to Fig. 2, are compared in a manner which is electrical in principle. As shown in Fig. 3, the voltages $e_A$ and $e_R$ are applied to a single solenoid switch 27 containing electrical contacts 28 and 29. The direction of the current flowing in the solenoid switch 27 depends upon which of the voltages $e_A$ and $e_R$ is larger in magnitude. Depending on which of the voltages is larger, the core 30 of the solenoid switch is moved in a direction to close either the electrical contacts 28 or 29. Closure of either set of contacts 28 or 29 applies either source of potential 31 or 32 to the servomechanism 33 to either tend to open or to tend to close the auxiliary control valve in the fuel system. The source of potential to drive servomechanism 33 may be from the source of potential 31 or the source of potential 32. The sources of potential 31 and 32 applied to servomechanism 33 have opposite polarities so that the application of one source of potential (one polarity) to the servo-motor 33 causes the auxiliary control valve to be opened and the application of the other source of potential (polarity) causes the auxiliary control valve to be closed. However, when the values of voltages $e_A$ and $e_R$ are equal in value neither source of potential 31 nor 32 is applied to the servomechanism 33. As indicated hereinabove when either voltage $e_R$ or $e_A$ is larger in magnitude than the other, one of the sources of potential 31 or 32, depending on which of the voltages $e_R$ or $e_A$ is the larger, is applied to the servomechanism 33 to effect a corresponding change in the position of the auxiliary fuel control valve until the voltages $e_A$ and $e_R$ are again equal. Concerning the embodiments of this invention described with reference to Fig. 2 and Fig. 3 it should be noted that the auxiliary fuel valve by-passes the main fuel valve so that closure of the former permits the latter to be controlling. If the auxiliary fuel valve is open, the main fuel valve can control only down to the rate of flow of fuel permitted by the auxiliary fuel valve.

Figure 4:
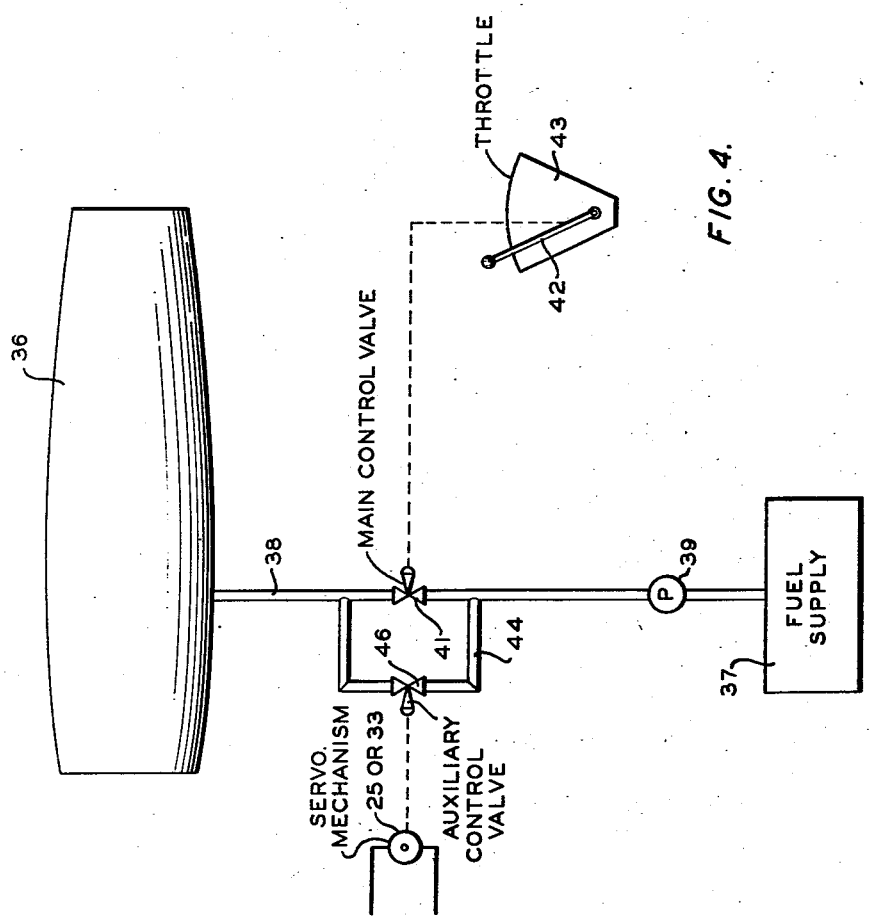
Figure 4 illustrates schematically a turbojet engine and a suitable fuel supply system therefor.

The relationship between the auxiliary fuel control valve and the main fuel control valve may be better understood by referring to Figure 4 which illustrates schematically a turbojet engine fuel supply system. Turbojet engine 36 comprising a compressor, a combusion chamber and a turbine is connected to a fuel source 37 by means of fuel line 38 containing a pump 39 and main control valve 41. Main fuel control valve 41 is operatively connected to throttle lever 42 of throttle 43 by means of suitable mechanical linkage. By-pass line 44 connected to fuel line 38 on either side of the main fuel control valve, contains auxiliary control valve 46. The auxiliary control valve is operatively connected to servomechanism 25 or 33 as shown in Figures 2 and 3.

Many variations of this invention as illustrated by the above-embodiments, are obvious to one skilled in the art. For example, the voltages $e_A$ and $e_R$ may be fed directly to a commercially available servomechanism instead of to the solenoids. Although the control of fuel flow by the servomechanism has been specified utilizing an auxiliary fuel control valve (by-pass) of the fuel system, the control of the fuel flow may be through the main fuel flow control valve in the fuel supply system in which embodiment various modifications of the embodiments shown in Fig. 2 and Fig. 3 are necessary for satisfactory operation.

As will be obvious to those skilled in the art many variations, substitutions and modifications which do not depart from the spirit or scope of this disclosure are possible and will readily suggest themselves.

I claim:

1. In a gas-turbine engine having a main fuel supply control, the improvement comprising, in combination: an auxiliary fuel valve in by-pass relation with said control; means for producing a voltage proportional to the pressure of the atmosphere surrounding said engine; means for producing a voltage proportional to the rotational velocity of the turbine; an armature means; means for applying the first-mentioned voltage to tend to cause movement of said armature means in one direction; means for applying the second-mentioned voltage to tend to cause said armature means to move in a different direction; and means linking said armature means with said auxiliary fuel valve to open said valve when said armature means moves in the first-mentioned direction and to throttle said valve when said armature means moves in the latter-mentioned direction.

2. In an aircraft gas-turbine engine having a rotor and a main fuel supply control, the improvement comprising, in combination: an auxiliary fuel supply valve in by-pass relation with said main control; means, including a barometric bellows, for producing a voltage proportional to the altitude of said engine; means, comprising a tachometer generator attached to said rotor, for producing a voltage proportional to the rotational velocity of said engine; a first solenoid having an armature; a second solenoid having an armature, connecting means rigidly connecting the armatures of said solenoids; a lever operatively connecting said connecting means with a reversing switch; a servo mechanism; a source of electrical energy connected to said servomechanism through said reversing switch; means operatively connecting said valve with said servo mechanism; means for applying the first-mentioned voltage to said first solenoid; and means for applying the second-mentioned voltage to the second solenoid to move said valve toward open position when said first-mentioned voltage exceeds said second-mentioned voltage and move said valve toward closed position when said second-mentioned voltage exceeds said first-mentioned voltage.

3. In an aircraft gas-turbine engine having a rotor and a main fuel supply control, the improvement comprising, in combination: an auxiliary fuel supply valve in by-pass relation to said main control; a servo mechanism adapted to open and close said valve; at least one source of electrical energy; a solenoid switch adapted to apply said energy to said mechanism in opposite directions at different positions of said switch; means, including barometric bellows, for producing a voltage proportional to the altitude of said engine; means, including a tachometer generator attached to said rotor, for producing a voltage proportion to the rotational velocity of said engine; means for applying said voltages to said switch in opposite directions and thereby cause said valve to move toward open position when the first-mentioned voltage exceeds the second and to move toward closed position when the second-mentioned voltage exceeds the first.

References Cited in the file of this patent

UNITED STATES PATENTS

| | | |
|---|---|---|
| 2,275,317 | Ryder | Mar. 3, 1942 |
| 2,336,232 | Doran | Dec. 7, 1943 |
| 2,412,289 | Pugh et al. | Dec. 10, 1946 |
| 2,489,586 | Ray | Nov. 29, 1949 |
| 2,542,499 | Fortescue | Feb. 20, 1951 |
| 2,566,319 | Deacon | Sept. 4, 1951 |
| 2,590,853 | Fulton | Apr. 1, 1952 |
| 2,644,300 | Waterman et al. | July 7, 1953 |

OTHER REFERENCES

Fuels and Combustion Handbook by Johnson and Auth, First Edition, 1951, published by McGraw-Hill Book Co., page 372, copy in Division 19.